United States Patent [19]

Berchem

[11] Patent Number: 4,591,089
[45] Date of Patent: May 27, 1986

[54] METHOD OF MAKING A COMPOSITE FORGED-METAL ARTICLE

[75] Inventor: Rütger Berchem, Gelsenkirchen, Fed. Rep. of Germany

[73] Assignee: Berchem & Schbaerg GmbH, Gelsenkirchen, Fed. Rep. of Germany

[21] Appl. No.: 651,671

[22] Filed: Sep. 17, 1984

[30] Foreign Application Priority Data

Sep. 20, 1983 [DE] Fed. Rep. of Germany ....... 3333913

[51] Int. Cl.⁴ .............................................. B23K 31/00
[52] U.S. Cl. ..................................... 228/167; 228/125
[58] Field of Search .............. 228/167, 125, 159, 160, 228/170, 172; 219/137 R, 101, 104; 29/159.3; 72/376

[56] References Cited

U.S. PATENT DOCUMENTS 2,399,706  6/1946  Friedman ........................... 29/159.3
4,118,848 10/1978  Goldschmidt ....................... 228/170

OTHER PUBLICATIONS

"A Dictionary of Metallurgy" by A. D. Merriman, pp. 93 and 95; pub. MacDonald & Evans, Ltd., 1958.

Primary Examiner—Nicholas P. Godici
Assistant Examiner—G. M. Reid
Attorney, Agent, or Firm—Karl F. Ross; Herbert Dubno

[57] ABSTRACT

A composite metal article having a massive portion connected to a plate portion in a connecting plane is formed by die forging the massive portion between dies so as to produce a flash fin in this plane on the massive portion and welding the plate directly to the fin in this plane.

6 Claims, 3 Drawing Figures

METHOD OF MAKING A COMPOSITE FORGED-METAL ARTICLE

FIELD OF THE INVENTION

My present invention relates to a composite metal article made at least in part by forging and, more particularly, to a machine element having a forged part and a plate-like part secured to the forged part. Specifically the invention relates to a method of making such an article and to the article made by the method.

BACKGROUND OF THE INVENTION

In many applications in machine tools or for ground working tools or for the fabrication of machine, vehicle and structural parts, it is desirable to make use of a composite construction of which a relatively massive member is constituted by a forging, especially a steel or alloy steel drop or die forging, and a metal plate which is welded to this forging.

For the most part, such elements have been fabricated by forging the massive part from a blank, billet or bloom of steel, removing any forging flash or fins which may be produced by the pressing of the material between the forging dies, positioning a surface of the forging with an edge of the plate, and welding the two together.

The welding operation may effect the contours of the forging in this case and the plate finishing of the forging prior to welding represents an expensive and time-consuming operation, especially where grinding is required for the removal of the flash or fin.

Furthermore, when the plate is welded directly to the body of the forging, significant stresses develop at the weld joint which cannot be absorbed by any resilience in the massive body of the forging so that premature rupture may be a danger. In any event, the connection between the plate and the forging has only limited ability to withstand stress, and especially alternate bending stress, which may lead to early fatigue.

Finally, because of the nature of the differences in the contours of the plate and the body of the forging at which the weld seam is to be produced, difficulties have been encountered in the automated production of the weld seam using welding robots and like automatons.

OBJECTS OF THE INVENTION

It is, therefore, the principal object of the present invention to provide an improved method of making a composite article of the type described whereby the fabrication and weld seam is simplified and more readily accomplished utilizing automatic means and welding robots, in particular.

Another object of this invention is to provide a method of making a composite body in which a plate is welded to a forging wherein the weld junction is capable of withstanding greater stresses and suffers less fatigue than is the case with earlier devices.

Another object of the invention is to reduce the fabrication costs in the making of such composite articles, yet obtaining articles with improved properties.

It is also an object of this invention to provide an improved composite article having the properties enumerated.

SUMMARY OF THE INVENTION

These objects and others, which will become apparent hereinafter are attained, in accordance with the present invention which provides a method of making a composite body, especially a steel body which comprises the steps of die forging a relatively massive part of this body between a pair of dies while pressing a flashing fin of the material of this part between the dies to form a fin, and welding a plate section to the fin preferably so that the fin and the plate lie in a common plane.

According to this invention, therefore, an edge of the fin is welded to an edge of the plate section and advantageously, the forging fin is produced in a thickness which corresponds substantially to the thickness of the plate which is welded thereto.

The fin can converge in thickness toward its edge which is welded to the plate and, in the latter case, therefore, the fin will taper outwardly to the thickness of the plate.

The edges of the plate and the fin which are joined by welding to one another, can be machined to allow the desired type of weld to be obtained. If a nondeposited butt weld is desired, the two surfaces can be machined so as to be flat and lie in surface contact with one another. However, if deposit welds are used, either with an X weld joint or a V weld joint, these edges are beveled accordingly and in the crevices between the beveled or chamfered surfaces, a weldment is deposited, e.g. by electric arc welding.

The invention is based upon my discovery that, when a flash of the forging is permitted to remain in this resulting fin as a thickness corresponding substantially to the thickness of the plate, a plate welded thereto can lie in a plane corresponding to the junction plane between the dies and any stresses which are then applied in this region can be taken up not only by the weld seam which is formed, but also by the fin on one side and the plate on the opposite side.

Since standard deposit welds can be formed without such precautions because the weld is removed from the massive portions and contours of the body of the forging, welding robots can be readily employed.

The stress distribution can be improved still further when, as previously noted, the fin tapers to the weld seam. In the latter construction, the fin forms a high-strength stiffening member for the machine element to greatly improve the polar moment of inertia and hence reduce the fatigue tendency of the article.

An important aspect of the invention is that it allows affixing a plate to a forged body along a predetermined connection line by forging that body so that the fin or flash formed between the two dies projects at this line, and then welding the plate to the fin.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
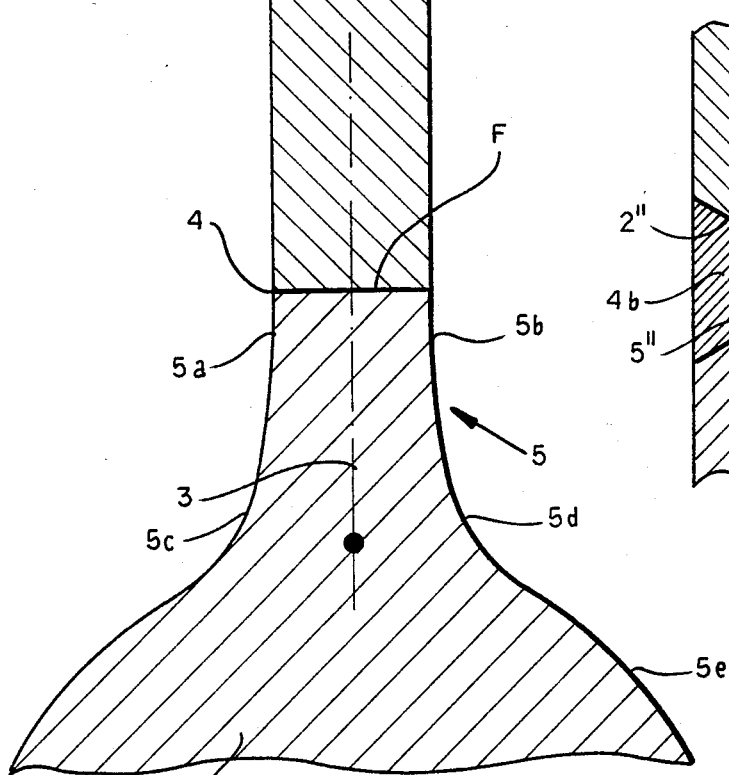
FIG. 1 is a partial cross sectional view through a composite article in accordance with the present invention.

In FIG. 1 I have shown a fragment of a composite article, e.g. a propeller or screw for driving a ship and which comprises a hub 1 forged from metal and which can be provided with a bore (not shown) allowing this hub to be mounted upon a shaft carrying the screw.

According to the invention, the forged part 1 is forged between a pair of dies which, with respect to this part, will be understood to have engaged the right and left sides thereof so that a portion or fin 5 of this material will be forced between these dies to produce the flash.

In the embodiment shown, the fin 5 has converging flanks 5a and 5b which are connected by fillets 5c and 5d to the rounded contour 5e of the body of the forging 1. A butt weld 4 connects the plate 2 to this fin, the thickness of this plate corresponding to the thickness of the fin 5 at the surface F of the latter. The plate is connected to the fin so that both the fin and plate lie in a connecting plane 3.

The fin 5 is of course the usual flash-produced fin generated in the die forging and which is not removed.

Figure 2:
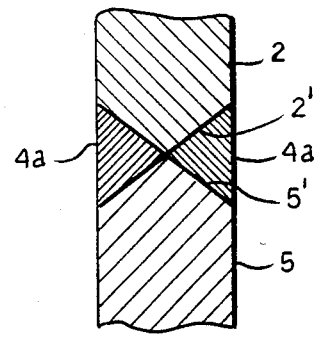
FIG. 2 is a detail view of a modified weld junction.

As can be seen from FIG. 2, both the edge of the fin as represented at 5' and the edge 2' of the plate can be beveled to form a pair of symmetrical V-shaped grooves in which weldment 4a is deposited to form an X-type weld seam.

Figure 3:
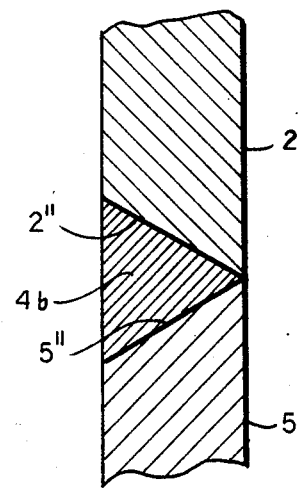
FIG. 3 is another detailed cross section of yet another embodiment of the weld junction.

In FIG. 3, the end faces of the fin and the plate are shown to be chamfered at 5' and 2', respectively, to form a single V-section groove in which the weld 4b is deposited.

I claim:

1. A method of making a composite metal article which comprises the steps of:
    die forging a metal body between a pair of dies while pressing material from said body between said dies to form a flash fin on said body; and
    welding a plate to said fin in substantially coplanarity therewith.
2. The method defined in claim 1 wherein said fin has a thickness at least at the weld between said fin and said plate substantially equal to the thickness of said plate.
3. The method defined in claim 1 wherein said fin tapers outwardly from said body to substantially the thickness of said plate.
4. The method defined in claim 1 wherein adjoining edges of said plate and said fin are machined to form a groove receiving a weldment forming said weld.
5. A method of making a composite metal article having a massive portion to which a plate is joined in a connecting plane, said method comprising the steps of:
    forging a metal body adapted to form said massive portion between a pair of forging dies and simultaneously forming between said dies a lateral flash extending from said body in said plane; and
    welding in said plane a plate of said fin whereby said fin connects said plate to said massive portion in said plane.
6. The method defined in claim 5, further comprising the step of machining confronting edges of said fin and said plate to bevel same and form a groove, said weld being formed by depositing a weldment in said groove.

* * * * *